United States Patent
Che (10) Patent No.: US 10,134,355 B2
(45) Date of Patent: Nov. 20, 2018

(54) TWO-PHASE HYBRID VERTEX CLASSIFICATION

(71) Applicant: Advanced Micro Devices, Inc., Sunnyvale, CA (US)

(72) Inventor: Shuai Che, Bellevue, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 14/720,293

(22) Filed: May 22, 2015

(65) Prior Publication Data

US 2016/0343343 A1    Nov. 24, 2016

(51) Int. Cl.
| | |
|---|---|
| G06F 13/14 | (2006.01) |
| G09G 5/00 | (2006.01) |
| G09G 5/04 | (2006.01) |
| G06T 1/20 | (2006.01) |

(52) U.S. Cl.
CPC ............... G09G 5/001 (2013.01); G06T 1/20 (2013.01); G09G 5/04 (2013.01)

(58) Field of Classification Search
CPC .......... G06F 3/14; G09G 5/006; G09G 5/001; G06T 1/20
USPC ........................................................ 345/520
See application file for complete search history.

(56) References Cited

U.S. PATENT DOCUMENTS

| | | | | |
|---|---|---|---|---|
| 5,761,077 A | * | 6/1998 | Shackleford | G06F 7/584 716/125 |
| 8,077,174 B2 | * | 12/2011 | Lindholm | G06F 9/5044 345/419 |
| 2014/0059319 A1 | * | 2/2014 | Noro | G06F 12/023 711/171 |

OTHER PUBLICATIONS

"Chapter 1 Vertex Coloring" (from website http://www.dcg.ethz.ch/lectures/podc/lecture/chapter1_2on1.pdf, dated as Sep. 17, 2012).*

(Continued)

*Primary Examiner* — Ke Xiao
*Assistant Examiner* — Gordon Liu (57) ABSTRACT

A processor performs vertex coloring for a graph based at least in part on the degree of each vertex of the graph and based at least in part with another coloring approach, such as comparison of random values assigned to the vertices. For each vertex in the graph, a processor determines whether the degree of the vertex is a local maximum; that is, whether the degree of the vertex is greater than the degree of each of its connected vertices. Each vertex having a local-maximum degree is assigned a specified or randomly selected color, and is then omitted from future iterations of the coloring process. After a stop criterion is met, the processor assigns random values to the remaining uncolored vertices and assigns colors based on comparisons of the random values.

16 Claims, 4 Drawing Sheets

(56) References Cited

OTHER PUBLICATIONS

Sariyuce, A. E., etc. Scalable Hybrid Implementation of Graph Coloring using MPI and OpenMP. 2012 IEEE 26th International Parallel and Distributed Processing Symposium Workshops & PhD Forum. Retrieved on Jul. 23, 2017. Retrieved from <http://ieeexplore.ieee.org/stamp/stamp.jsp?tp=&arnumber=6270850>.*

Mark T. Jones et al., "A Parallel Graph Coloring Heuristic", ARgonne National Laboratory, Argonne, IL 60439, Feb. 1, 1992, 21 pages.

Jonathan Cohen et al., "Efficient Graph Matching and Coloring on the GPU", NVIDIA Third Annual GPU Technology Conference (GTC), accessed at <<http://developer.download.nvidia.com/GTC/PDF/GTC2012/PresentationPDF/S0332-GTC2012-Graph-Coloring-GPU.pdf>>, May 1, 2012, 58 pages.

Michael Luby, "A Simple Parallel Algorithm for the Maximal Independent Set Problem", Proceedings of the seventeenth annual ACM symposium on Theory of computing. ACM, Dec. 1, 1985, 10 pages.

\* cited by examiner

TWO-PHASE HYBRID VERTEX CLASSIFICATION

BACKGROUND

Field of the Disclosure

The present disclosure relates generally to processors and more particularly to vertex coloring at a processor.

Description of the Related Art

Vertex coloring, also known as graph coloring, is widely used in a variety of applications to efficiently assign processor resources. The resource assignment process begins by forming a graph to represent each of a plurality of processor resources (e.g., hardware resources and software structures at a processor). The graph is composed of a set of vertices and connections between the vertices, where each vertex represents a corresponding processor resource and each connection represents a relationship between processor resources. Vertex coloring is initiated by assigning "colors" to the vertices of the graph based on a set of constraints or rules for resource assignment, where the constraints represent a limitation of the processor resources. For example, in some scenarios each vertex of the graph can represent an execution unit of a processor, wherein the connections between the vertices indicate that the corresponding execution units share a register or other resource that cannot be used simultaneously by two different execution units. The color assigned to each vertex represents a time slot for execution of a specified task. To prevent execution units from using a shared resource simultaneously, the colors assigned to the vertices are constrained so that no two connected vertices share the same color. Vertex coloring can be an efficient way to assign resources for a processor having many resources and many relationships between these resources. However, conventional vertex coloring techniques can take excessively long to complete, limiting processor efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for performing vertex classification (e.g., vertex coloring) at a processor for a graph using a two-stage process, wherein a first classification process is employed to assign classes to vertices associated with a relatively high amount of classification complexity, and a second process is employed after the first to assign classes to the remaining vertices. For example, in some embodiment colors are assigned to graph vertices based at least in part on the degree (that is, the number of connected vertices) of each vertex of the graph and at least in part based on a comparison of random values assigned to at least a subset of the vertices. For each vertex in the graph, the processor determines whether the degree of the vertex is a local degree maximum; that is, whether the degree of the vertex is greater than the degree of each of its connected vertices. Each vertex having a local degree maximum is assigned a specified or randomly selected color, and is then omitted from future iterations of the coloring process. This process is repeated until a stop criterion has been met. In response to meeting the stop criterion, the processor assigns random values (e.g., numbers) to the remaining vertices, identifies local value maximums based on comparisons of the random values assigned to the vertices, and assigns a specified or randomly selected color to the vertices corresponding to the local value maximums. This process of assigning colors based on comparisons of random values is repeated until all vertices have been assigned a color. By assigning colors to vertices based on a combination of vertex degrees and comparison of random values, the colors can be assigned quickly while ensuring that coloring constraints are met, simplifying color assignment and improving processing efficiency. It will be appreciated that coloring classifying vertices through the use of color is only an example, and other forms of classification, such as numbering where vertices are assigned different numbers, or assigning other distinct categories to vertices are possible and contemplated.

To illustrate, vertex classification can performed at the processor by assigning different vertices of a graph to represent different processing units, such as different cores of a single-instruction multiple data (SIMD) unit of a graphics processing unit (GPU) of the processor. Conventionally, the classification process proceeds iteratively, such that with each iteration each SIMD unit core randomly assigns values to each vertex, then assigns a class based on the local value maximum of the vertices. However, each iteration of the classification process cannot be completed until each of the SIMD unit cores has checked the value of its assigned vertex against the values of the connected vertices. Because the time required for the constraint check for a given vertex depends in large part on the degree of the vertex, the time to complete each classification iteration is generally governed by the time required to process higher degree vertices. By first assigning classes based on vertex degree, high degree vertices can be removed from the classification process relatively quickly, reducing the time to complete subsequent classification iterations and therefore shortening the overall time to complete the classification process. However, at some point, assigning classes based on vertex degree will either be inefficient relative to assigning classes based on comparison of random values (because the remaining vertices are of relatively small degree, or will be impossible to meet a given coloring constraint (because, for example, all remaining connected vertices have the same degree). By changing from degree-based classification to value-comparison-based classification in response to a stop criterion being met, the techniques described herein ensure that classification of the graph vertices can be completed efficiently.

Figure 1:
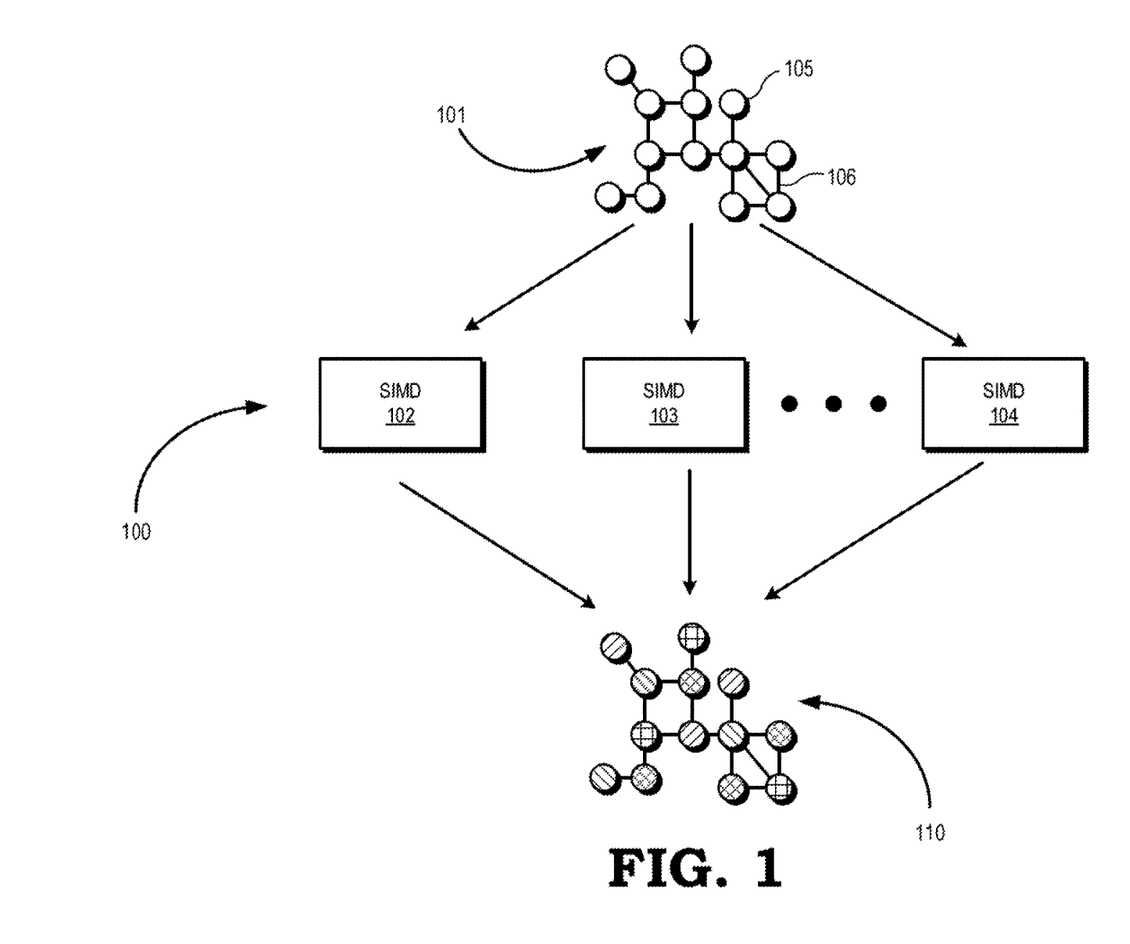
FIG. 1 is a block diagram of a processor performing vertex coloring based at least in part on the degree of each vertex in accordance with some embodiments.

FIG. 1 illustrates classification of vertices of a graph 101 at a processor 100 in accordance with some embodiments.

For purposes of description, the classification process described with respect to FIG. 1 is a vertex coloring process. However, it will be appreciated that classes other than colors can be assigned using the techniques described herein, and that the colors assigned can be visual spectrum color values or other classification values, including numbers, alphanumeric strings, and the like. The processor 100 includes a plurality of SIMD units (e.g., SIMD units 102, 103, and 104). In some embodiments, the SIMD units 102-104 are part of a graphics processing unit (GPU) of the processor 100 generally configured to execute operations related to graphics and display. To illustrate, the processor 100 can include multiple processing units, including one or more central processing units (CPUs, not shown in FIG. 1) and one or more GPUs. The CPUs are generally configured to execute computer instructions organized in the form of computer programs. In some embodiments, computer instructions are divided (either explicitly or implicitly) into subsets referred to as threads, and each thread can be executed at a processing unit. The CPUs are generally assigned (e.g. by an operating system or other task scheduler) to execute threads associated with relatively low-latency operations, such as processing of user inputs, initiation and termination of application programs, and the like. The GPUs are generally assigned threads wherein a set of similar functions are executed on a relatively large amount of data, such as graphics operations, vector and array processing, and the like. With this configuration of CPUs and GPUs, the processor 100 can be incorporated into any of variety of electronic devices, such as a desktop or laptop computer, a server, a smartphone, a tablet, a gaming console, and the like.

In the course of executing computer programs, the processor 100 sometimes assigns its resources to different tasks such as different tasks associated with the execution of one or more software threads or operations while meeting specified constraints. As used herein, a processor resource can refer to hardware resources of the processor, such as SIMD units or SIMD unit cores, processor cores, registers, memory locations, input/output interfaces, and the like, and can also or in addition refer to data to be manipulated by the hardware resources, such as arrays, vectors, and other data structures. Assigning a resource to a task refers to using that resource in the course of performing the indicated task. The assignment of a resource is generally a function of time; that is, a resource can be assigned to one task for a given amount of time, and then reassigned to a different task for a different amount of time. To illustrate via an example, the threads executing at the processor 100 may specify a task comprising using the cores of the SIMDs 102-104 as resources to perform a set of operations to be performed on a data structure stored in memory. In response, the processor 100 divides the data structure into different subsets, and assigns each core of one or more of the SIMDs 102-104 as a resource to perform the set of operations on a different one of the subsets. Once a core has completed the set of operations for its assigned subset of data, the core can then be assigned a different subset or assigned to a different task altogether.

In some scenarios, the assignment of resources by the processor 100 is subject to one or more constraints. For example, some of the resources of the processor 100 may be shared resources in that the resources employ some of the same hardware or other processor aspects to execute their assigned tasks. For example, SIMD cores are processor resources that may share one or more of the same registers to perform their assigned tasks. The processor 100 should ensure that the shared resources are not both assigned a task at the same time, because such an assignment could result in both of the shared resources attempting to simultaneously use the shared hardware or other processor aspects, resulting in errors. That is, the use of a shared resource is constrained to only one task at a time. Failure to accommodate the constraints on resources (referred to herein as satisfying or meeting the constraints), such as by assigning a shared resource for concurrent use for different tasks, can result in serious errors at the processor 100.

To facilitate the assignment of resources while ensuring that constraints on those resources are satisfied, the processor 100 can use vertex coloring. The processor 100 first assesses, based on the threads that are scheduled for execution, one or more tasks that the processor 100 is to perform, the resources required to execute those operations, and the constraints on those resources. These assessments, as well as the graph coloring operations described further below, can be performed by software executing at the processor 100, such as an operating system (OS), by dedicated hardware modules, or a combination thereof.

Based on the assessed tasks, resources, and constraints, the processor 100 forms a graph 101 including a number of vertices (e.g., vertex 105) and edges connecting the vertices (e.g., edge 106). Each vertex can represent a resource of the processor 100, and each edge can represent a relationship between the corresponding resources. For example, each vertex can correspond to a SIMD unit. The edges between vertices indicate that the corresponding resources share one or more hardware modules or other features, such as one or more registers.

To assign resources to one or more tasks, the processor 100 can apply color to the vertices of the graph 101, wherein each color represents assignment of a particular resource to a task at a particular time. For example, the task to be executed may be require operations to be executed over five different time slots, with each time slot corresponding to a different one of five colors. Assignment of a color to a particular vertex indicates that the resource corresponding to the vertex is assigned to carry out the operation during the time slot corresponding to the color. The processor 100 assigns colors to the vertices of the graph 101 under a designated set of constraints, wherein the constraints reflect, for example, restrictions on how resources of the processor 100 can be assigned. For example, in cases where the edges of the graph 101 represent the sharing of resources between hardware modules, the set of constraints requires that no two vertices connected by an edge share the same color. This set of constraints ensures that hardware modules that share resources are not both assigned to execute an operation during the same time slot. It will be appreciated that the vertices, edges, and constraints described above are only an example, and that different graphs may represent different resources and relationships between resources, and that the coloring of graphs may be subject to different constraints, without departing from the scope of the present disclosure.

To assign colors to the vertices of the graph 101, a scheduler at the processor 100 (e.g., an operating system or other program, a hardware scheduler, and the like) assigns each vertex of the graph 101 to a different core of at least one of the SIMD units 102-104. For purposes of description, it is assumed that the processor 100 includes a sufficient number of SIMD unit cores so that all of the vertices of the graph 101 can be assigned to a different SIMD unit core. For example, the graph 101 can be represented by a data structure comprising a plurality of vectors, with each vector being associated with a different vertex, referred to as the vector's assigned vertex, and the vector values indicating the vertices to which the assigned vertex is connected. For example, each vertex in the graph can be assigned a different number, and the values of each vector indicating the numbers of the vertices to which the vertex's assigned vector is connected. The cores of the SIMD units 102-104 proceed iteratively, wherein during each iteration each SIMD unit determines whether the degree of its assigned vertex is a local degree maximum. As used herein, the term local degree maximum is defined as follows: a vertex is a local maximum if the number of its connected vertices is greater than the number of vertices connected to each of its connected vertices. For example, a given Vertex A may be connected to Vertices B, C, D, and E. Vertices B and E are each connected to two vertices (Vertex A and one other vertex) and Vertices C and D are each connected to one vertex (Vertex A). Vertex A is a local degree maximum because it is connected to 4 vertices, which is greater than the number of vertices connected to Vertex B, greater than the number of vertices connected to Vertex C, greater than the number of vertices connected to Vertex D, and greater than the number of vertices connected to Vertex E. During each iteration, a SIMD unit identifies the degree of its assigned vertex, then communicates with the SIMD units assigned to the connected vertices, so that each SIMD unit forms another vector indicating the degree of its assigned vertex and the degree of each of the vertices connected vertices. Based on a comparison of the vector values, each SIMD unit determines whether its assigned vertex is a local maximum.

In response to determining that its assigned vertex is a local degree maximum, the SIMD unit core assigns the vertex a designated color. For example, in some embodiments the processor 100 randomly generates a list of colors. For the first iteration of the coloring process, the SIMD unit core assigns the first color on the list, and for subsequent iterations the SIMD unit core proceeds through the list, so that each iteration is associated with a different color from the list and the SIMD unit core assigns the color associated with the given iteration. Vertices that are not local degree maximums are not assigned colors during the iteration. For vertices that have been assigned colors, the scheduler or other module of the processor 100 stores an indication of the vertex and its color assignment. The scheduler then omits the vertices that have been assigned colors from subsequent iterations of color assignment.

The processor 100 iteratively repeats this color assignment process based on vertex degree until a stop criterion has been reached. In response to the stop criterion being reached, the processor 100 switches to assigning colors based on comparison of random values assigned to the remaining vertices. For example, in some embodiments, in response to reaching the stop criterion, the processor 100 randomly assigns values to each remaining vertex. For each vertex, the processor 100 forms a vector indicating the value assigned to that vertex and the values assigned to each of the vertices connected to the vertex. The processor 100 assigns each vector to a different one the cores of the SIMD units 102-104, and each SIMD unit core uses the vector values to identify whether it assigned vertex is a local value maximum. As used herein, a local value maximum refers to a maximum of values assigned to connected vertices. For example, a given Vertex A may be connected to Vertices B, C, D, and E. Vertex A is randomly assigned a value of nineteen, Vertex B is randomly assigned a value of seven, Vertex C is randomly assigned a value of fifteen, Vertex D is randomly assigned a value of six, and Vertex E is randomly assigned a value of ten. Vertex A is the local value maximum because it has been assigned a value greater than any of its connected vertices. The cores of the SIMD units 102-104 assign a selected color to the vertices identified as local value maximums, and then remove those vertices from consideration for future iterations. For the next iteration, the processor 100 assigns new random values to the remaining vertices, forms new vectors for the SIMD unit cores, and the SIMD unit cores identify local maximums based on the vectors. The processor 100 iteratively repeats the process until all vertices have been assigned a color.

By assigning colors to vertices based both on degree and on comparison of random values, the processor 100 is able to remove high-degree vertices relatively early in the color assignment process, reducing the amount of time required to assign colors to all vertices, while ensuring that all vertices are assigned a color. To illustrate, in many scenarios (e.g. for graphs exhibiting power law or scale free characteristics) the graph to be colored includes a few high-degree vertices and many more low-degree vertices having the same or similar degree. The time required to complete a coloring iteration based on comparison of randomly assigned values is governed, at least in part, by the higher-degree vertices, because each vertex must be compared to all its connected vertices before any vertex can be assigned a color. That is, the SIMD unit cores operate in parallel in order to identify colors for their assigned vertex, and the next iteration of the coloring process cannot begin until all SIMD unit cores have completed their coloring process for the iteration. Thus, if the processor 100 were to assign colors based only on the local-maximum process, during each iteration SIMD unit cores assigned low-degree vertices stall while they await completion of the iteration by SIMD unit cores assigned higher-degree vertices. By removing high-degree vertices early in the color assignment process, the length that the SIMD unit cores are stalled, and therefore the time required to complete coloring iterations is reduced, thereby reducing the amount of time required to assign colors to all vertices. However, because the graph is likely to include connected vertices of the same degree, assigning colors only based on vertex degree would cause some vertices to remain uncolored, complicating resource assignment. By switching to coloring based on comparison of assigned values once the stop criterion has been reached, the processor 100 ensures that all vertices of the graph will be colored.

The stop criterion can be selected from a number of stop criteria, such as a number of iterations, a number of vertices, a vertex degree and the like. For example, in some embodiments the processor 100 can stop assigning colors to vertices of the graph 101 based on vertex degree in response to determining that, of the vertices to which colors have not yet been assigned, the degree of the highest-degree vertex is less than a threshold number. In some embodiments, the processor 100 stops assigning colors based on degree in response to identifying that less than a threshold number of vertices do not have colors assigned. In some embodiments, the processor 100 stops assigning colors based on degree in response to determining that more than a threshold number of vertices have been assigned a color based on degree, or based on the highest degree vertex to which a color has not been assigned has less than a threshold number of connected vertices. In some embodiments, the processor 100 stops assigning colors based on degree in response to determining that the total number of colorable vertices using a degree-based approach is smaller than a threshold which can fully utilize all of the cores of the SIMD units 102-104.

The processor 100 assigns colors to each vertex of the graph 101, resulting in a graph 110 where every vertex is associated with its assigned color. The processor 100 uses the graph 110 to assign resources to one or more operations, based on the resources represented by the vertices and the resources represented by the colors. For example, in some embodiments each vertex represents an execution unit of the processor 100, and each color represents a time slot. Based on the graph 110, the processor 100 assigns an operation to each execution unit at its corresponding time slot, as indicated by the color of the corresponding vertex.

Figure 2:
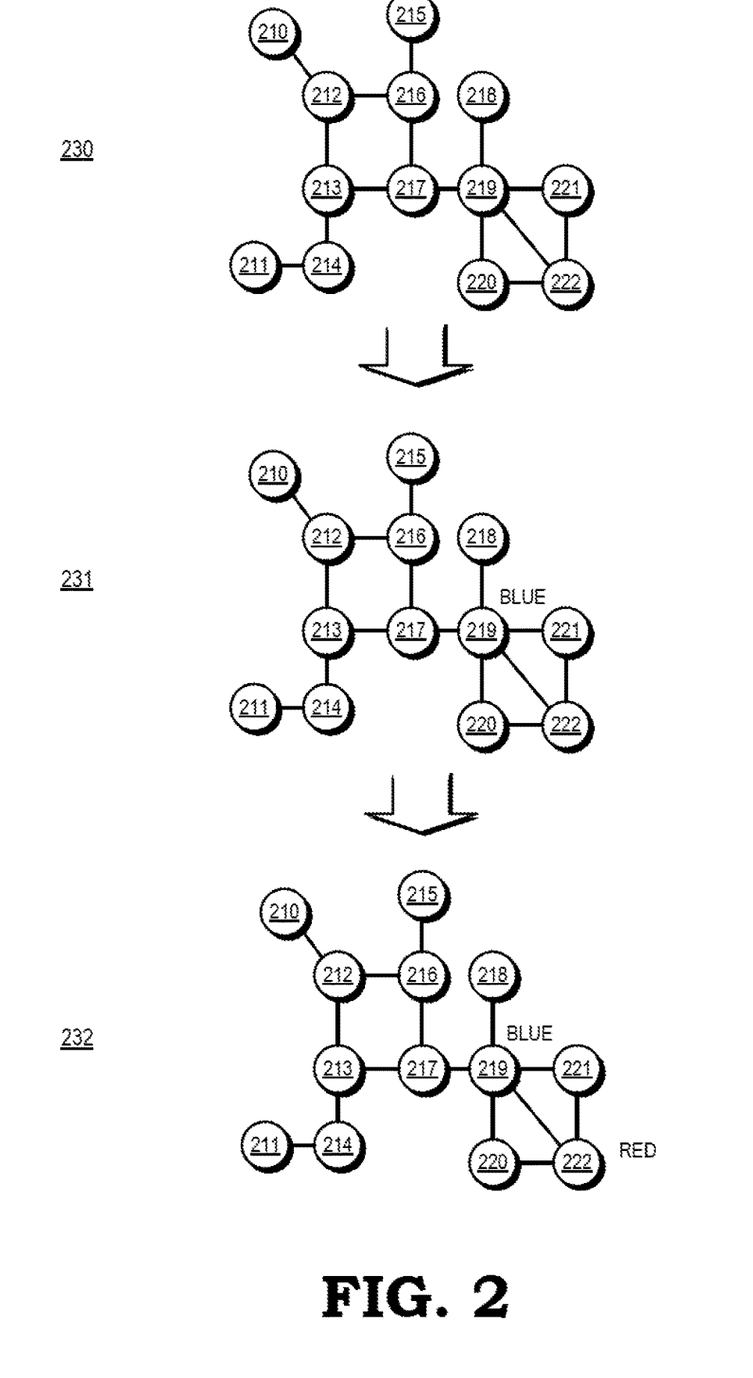
FIG. 2 is a diagram illustrating an example of the processor of FIG. 1 assigning colors to vertices of a graph based on the degree of the vertices in accordance with some embodiments.

FIG. 2 illustrates an example of the processor 100 coloring vertices of a graph 201 based on vertex degree in accordance with some embodiments. The graph 201 includes vertices 210-222. At time 230, the processor 100 performs a first iteration of vertex coloring, wherein it identifies that vertex 219 is a local degree maximum. To illustrate, vertex 219 is connected to five vertices: Vertices 217, 218, 220, 221, and 222. Vertex 219 therefore has a degree of five. Vertices 217 and 222 each have a degree of three, vertices 221 and 220 each have a degree of two, and vertex 218 has a degree of one. Vertex 219 has a higher degree than any of its connected vertices and is therefore a local degree maximum. In response to identifying that vertex 219 is a local degree maximum, the processor 100 assigns it a color, designated "BLUE", at time 231.

The processor 100 then performs another coloring iteration at time 232, this time omitting vertex 219 from consideration as it has already been assigned a color. Accordingly at time 232 the processor 100 identifies vertex 222 as a local degree maximum, as it has a degree of two (because vertex 219 is omitted) and its connected vertices 220 and 221 each have a degree of one. Because it is a local degree maximum, the processor assigns the vertex 222 a color associated with the iteration (designated "RED"), then removes vertex 222 from subsequent color assignment iterations. The processor 100 continues to assign colors based on degree until a stop criterion is met, then assigns colors to the remaining vertices based on comparison of random values, as illustrated at FIG. 3.

Figure 3:
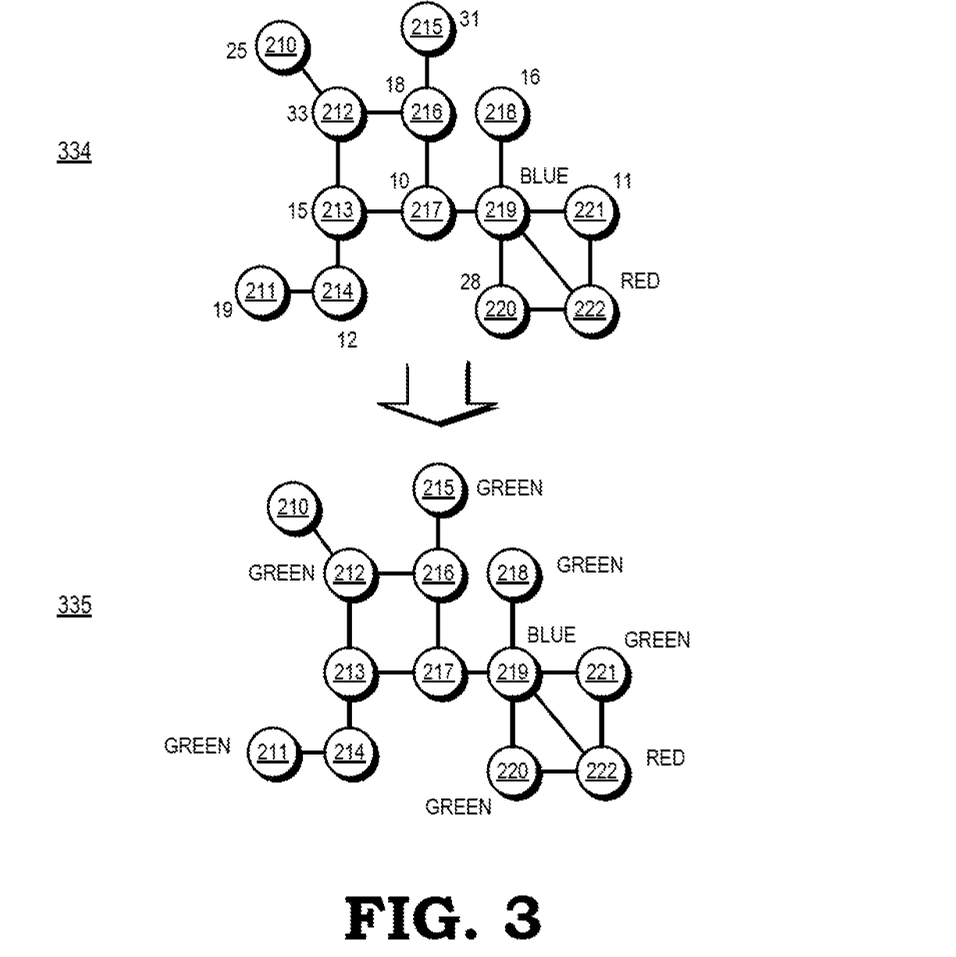
FIG. 3 is a diagram illustrating an example of the processor of FIG. 1 assigning colors to vertices of a graph based on comparison of random numbers assigned to a subset of the vertices after assigning colors based on vertex degree in accordance with some embodiments.

FIG. 3 is a diagram illustrating an example of the processor 100 assigning colors to the remaining vertices of the graph 201 based on comparison of random numbers assigned to a subset of the vertices after assigning colors based on vertex degree (as illustrated in FIG. 2) in accordance with some embodiments. At time 334, in response to reaching a stop criterion (e.g., a threshold number of vertices being assigned a color based on degree) the processor 100 assigns random values to the subset of vertices that have not yet been assigned a color. In particular, the processor 100 assigns random values to vertices 210-218, 220, and 221.

At time 335, the processor 100 selects a color that has not yet been used for color assignment. In the example of FIG. 3, the processor 100 selects the color designated "GREEN". The processor 100 then identifies the vertices 211, 212, 215, 218, 220, and 221 as local value maximums because each of those vertices was assigned values higher than the values assigned to their connected vertices. Note that vertices 218, 220, and 221 are local value maximums because their connected vertices have already been assigned a color. In some embodiments, vertices that have previously been assigned a color are assigned a value of zero to ensure the correct effect on calculation of local value maximums.

After time 335, the processor 100 can select a new color that was not previously used, assign a value of zero to all vertices that were previously assigned a color, determine local value maximums, and assign the selected color to any vertex identified as a local value maximum. The processor 100 repeats this process until all vertices have been assigned a color.

Figure 4:
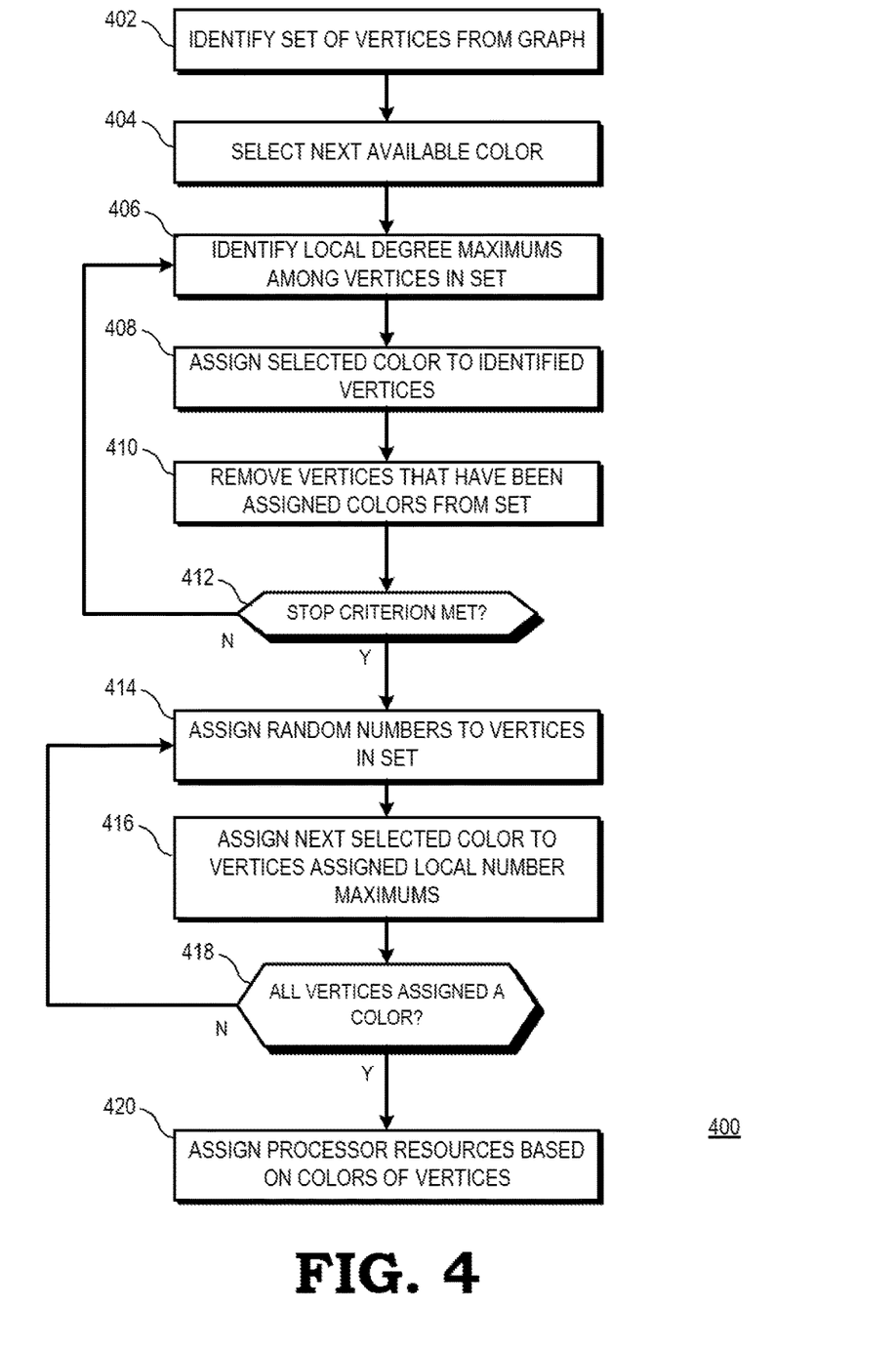
FIG. 4 is a flow diagram of a method of coloring vertices based on both vertex degree and comparison of random numbers assigned to the vertices in accordance with some embodiments.

FIG. 4 illustrates a flow diagram of a method 400 of coloring vertices of a graph based on vertex degree in accordance with some embodiments. At block 402, the processor 100 generates a graph having a set of vertices and edges, wherein the vertices represent processor resources and the edges represent relationships between the processor resources. At block 404, the processor 100 selects the next available color from a predefined set of available colors. At block 406, the SIMDs 102-104 identify vertices of the set whose corresponding degrees are a local degree maximum. To illustrate, in some embodiments, each vertex in the set of vertices is assigned to a different one of the cores of SIMDs 102-104. Each of the cores identifies the degree of its assigned vertex and the degree of each vertex connected to its assigned vertex. If the degree of its assigned vertex is higher than the degrees for each connected vertex, the core identifies its assigned vertex as a local degree maximum. At block 408 the processor 100 assigns the color selected at block 404 to each vertex that has been identified as a local degree maximum. The processor 100 then marks the selected color as unavailable for selection for subsequent coloring iterations.

At block 410 the processor 100 removes those vertices that have been assigned a color from the set of vertices (so they are not considered during subsequent coloring iterations). At block 412 the processor 100 identifies whether a stop criterion, such as a number of coloring iterations, a maximum vertex degree threshold, or other criterion has been met. If not, the method flow returns to block 406 and the processor 100 performs another coloring iteration based on vertex degree. If, at block 412, the stop criterion has been met the method flow moves to block 414 and the processor 100 assigns random values to the vertices remaining in the set of vertices. The method flow proceeds to block 416 and the processor 100 identifies local value maximums based on the random values, assigns the next selected color to the vertices corresponding to local value maximums, and removes the colored vertices from the set to be considered during subsequent iterations. At block 418, the processor 100 identifies whether all vertices have been assigned a color. If not, the method flow returns to block to block 414 and the processor 100 executes a new random assignment of value to the remaining uncolored vertices. If, at block 418, the processor 100 determines that all vertices have been assigned a color, the method flow proceeds to block 418 and the processor 100 assigns processor resources to one or more operations based on the colors of the vertices.

In some embodiments, the apparatus and techniques described above are implemented in a system comprising one or more integrated circuit (IC) devices (also referred to as integrated circuit packages or microchips), such as the processor described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving at a first processor a graph comprising a plurality of vertices, each of the plurality of vertices representing resources of the first processor;
   assigning classifications to each of the plurality of vertices, wherein assigning classifications comprises:
      assigning a first classification to a first vertex of the plurality of vertices according to a first classification technique based on the first vertex having more connected vertices than each of a subset of vertices connected to the first vertex;
      removing the first vertex from future assignments of classifications in response to the first vertex being assigned the first classification;
      assigning a second classification to a second vertex of the plurality of vertices according to the first classification technique in response to a stop criterion not being met, the stop criterion comprising a number of assigning iterations or a vertex degree threshold;
      stopping assigning classifications according to the first classification technique to vertices of the plurality of vertices in response to the stop criterion being met;
      assigning a third classification to a third vertex of the plurality of vertices different from the first vertex and the second vertex based on a second classification technique different from the first classification technique in response to the stop criterion being met, so that the third vertex, the first vertex and the second vertex do not share their assigned classifications with any of their connected vertices and so that the third classification is not assigned to any vertex of the plurality of vertices to which the first classification or the second classification is assigned; and
   assigning processor resources based on the classifications assigned to the plurality of vertices.

2. The method of claim 1, wherein assigning the third classification to the third vertex is based on a comparison of random numbers assigned to at least a subset of the plurality of vertices.

3. The method of claim 2, wherein assigning the third classification to the third vertex comprises:
   assigning the random numbers to at least the subset of the plurality of vertices, the subset including the third vertex; and
   assigning the second classification to the third vertex in response to a number assigned to the third vertex being a maximum of the random numbers assigned to at least the subset of the plurality of vertices.

4. The method of claim 3, wherein assigning the third classification to the third vertex comprises assigning the random numbers to at least the subset of the plurality of vertices in response to the third vertex having less than a threshold number of connected vertices in the graph.

5. The method of claim 4, wherein assigning the third classification to the third vertex comprises assigning the random numbers to at least the subset of the plurality of vertices in response to identifying that a threshold number of the plurality of vertices has been assigned classifications based on a number of connected vertices.

6. The method of claim 1, wherein the first processor comprises a plurality of processor cores, and wherein a first processor core of the plurality of processor cores assigns the first classification to the first vertex and the second classification to the second vertex and a second processor core of the plurality of processor cores assigns the third classification to the third vertex.

7. The method of claim 6, wherein assigning classifications to the plurality of vertices comprises assigning each vertex to a different corresponding processor core of the plurality of processor cores, and assigning a classification to each of the plurality of vertices at its corresponding processor core.

8. The method of claim 7, wherein assigning classifications to each of the plurality of vertices further comprises assigning classifications to the plurality of vertices at the plurality of processor cores concurrently.

9. The method of claim 1, wherein assigning processor resources comprises assigning resources of a second processor different from the first processor.

10. A method, comprising:
receiving, by a processor, a graph comprising a plurality of vertices, each of the plurality of vertices representing data to be manipulated at the processor;
assigning, by the processor, first classifications to a first subset of the plurality of vertices according to a first classification process based on numbers of vertices connected to each vertex in the first subset;
removing each vertex of the first subset of the plurality of vertices from future assignments in response to the vertex being assigned a first classification;
stopping assigning classifications to the first subset of the plurality of vertices in response to a stop criterion being met, the stop criterion comprising a number of assigning iterations or a vertex degree threshold;
assigning, by the processor, second classifications to a second subset of the plurality of vertices different from the first subset based on a second classification process different from the first classification process in response to the stop criterion being met, wherein the second classification process comprises assigning classifications based on a comparison of random values assigned to vertices in the second subset, so that no connected vertices of the plurality of vertices share the same classification and so that the second classifications are not assigned to any vertex of the plurality of vertices to which the first classifications are assigned; and
assigning processor resources at the processor to process the data based on the classifications assigned to the first subset of the plurality of vertices and the classifications assigned to the second subset of the plurality of vertices.

11. The method of claim 10, wherein the stop criterion is identifying that a threshold number of vertices have been assigned classifications in the first sub set.

12. The method of claim 10, wherein the stop criterion is identifying that a vertex in the second subset of the plurality of vertices has less than a threshold number of connected vertices.

13. A non-transitory computer readable storage medium embodying a set of executable instructions, the set of executable instructions to manipulate at least one processor to:
receive at a first processor a graph comprising a plurality of vertices, each of the plurality of vertices representing resources of the processor;
assign classifications to each of the plurality of vertices, wherein assigning classifications comprises:
assigning a first classification to a first vertex of the plurality of vertices according to a first classification technique based on the first vertex having more connected vertices than each of a subset of vertices connected to the first vertex;
removing the first vertex from future assignments of classifications in response to the first vertex being assigned a first classification;
assigning a second classification to a second vertex of the plurality of vertices according to the first classification technique in response to a stop criterion not being met, the stop criterion comprising a number of assigning iterations or a vertex degree threshold;
stopping assigning classifications to vertices according to the first classification technique in response to the stop criterion being met;
assigning a third classification to a third vertex of the plurality of vertices different from the first vertex and the second vertex based on a second classification technique different from the first classification technique in response to the stop criterion being met, so that the third vertex, the first vertex and the second vertex do not share their assigned classifications with any of their connected vertices and so that the third classification is not assigned to any vertex of the plurality of vertices to which the first classification or the second classification is assigned; and
assign processor resources based on the classifications assigned to the plurality of vertices.

14. The non-transitory computer readable storage medium of claim 13, wherein the instructions to assign classifications to each of the plurality of vertices comprise instructions to assign the third classification to the third vertex based on a comparison of random numbers assigned to at least a subset of the plurality of vertices.

15. The non-transitory computer readable storage medium of claim 13, wherein the instructions to assign the third classification according to the second classification technique comprise instructions to:
assign random numbers to at least a subset of the plurality of vertices, the subset including the third vertex; and
assign the third classification to the third vertex in response to a number assigned to the third vertex being a maximum of the random numbers assigned to at least the subset of the plurality of vertices.

16. The non-transitory computer readable storage medium of claim 15, wherein the instructions to assign the third classification to the third vertex comprise instructions to assign the random numbers to at least the subset of the plurality of vertices in response to the third vertex having less than a threshold number of connected vertices in the graph.

* * * * *